(12) United States Patent
Weick et al.

(10) Patent No.: US 9,393,643 B2
(45) Date of Patent: Jul. 19, 2016

(54) OPTICAL ELEMENT OF A LASER MATERIAL-PROCESSING MACHINE

(71) Applicant: TRUMPF Werkzeugmaschinen GmbH + Co. KG, Ditzingen (DE)

(72) Inventors: Juergen-Michael Weick, Asperg (DE); Thomas Rupp, Ludwigsburg (DE); Dominik Vees, Tuebingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 319 days.

(21) Appl. No.: 14/139,130

(22) Filed: Dec. 23, 2013

(65) Prior Publication Data

US 2014/0183175 A1    Jul. 3, 2014

Related U.S. Application Data

(63) Continuation of application No. PCT/EP2012/061086, filed on Jun. 12, 2012.

(30) Foreign Application Priority Data

Jun. 29, 2011   (DE) .......................... 10 2011 078 359

(51) Int. Cl.
| | |
|---|---|
| *B23K 26/02* | (2014.01) |
| *B23K 26/10* | (2006.01) |
| *B23K 26/03* | (2006.01) |

(52) U.S. Cl.
CPC ............... *B23K 26/03* (2013.01); *B23K 26/702* (2015.10); *B23K 26/707* (2015.10)

(58) Field of Classification Search
CPC ................ B23K 26/02–26/0344; B23K 26/08; B23K 26/12; B23K 26/127–26/128; B23K 26/702; B23K 26/706–26/707
USPC .......................................... 219/121.6–121.86
See application file for complete search history.

(56) References Cited

U.S. PATENT DOCUMENTS

| | | | |
|---|---|---|---|
| 4,732,450 A | * | 3/1988 | Lee ....................... G02B 6/4296 385/33 |
| 6,809,860 B2 | | 10/2004 | Stenzel |
| 8,031,224 B2 | | 10/2011 | Linsenmaier et al. |
| 8,519,849 B2 | | 8/2013 | Ross-Messemer |
| 8,591,105 B2 | | 11/2013 | Weick |

(Continued)

FOREIGN PATENT DOCUMENTS

| | | |
|---|---|---|
| DE | 10055534 B4 | 3/2005 |
| DE | 102004048099 A1 | 4/2006 |

(Continued)

OTHER PUBLICATIONS

International Search Report from corresponding PCT Application No. PCT/EP2012/061086, mailed Sep. 21, 2012, 4 pages.

(Continued)

*Primary Examiner* — Sang Y Paik
(74) *Attorney, Agent, or Firm* — Fish & Richardson P.C.

(57) ABSTRACT

An optical element for installation in a laser processing machine has a surface that is optically unused and/or not subject to a laser beam during operation of the laser processing machine when the optical element is installed in the laser processing machine, and a transponder disposed in a region on or near the surface and containing readable information relating to the optical element.

10 Claims, 2 Drawing Sheets

(56) References Cited

U.S. PATENT DOCUMENTS

| | | | |
|---|---|---|---|
| 2005/0004921 A1* | 1/2005 | Beenau | G06Q 20/00 |
| 2007/0291379 A1 | 12/2007 | Lambert et al. | |
| 2008/0218355 A1* | 9/2008 | Downie | H04B 10/2575 340/572.7 |
| 2011/0069379 A1 | 3/2011 | Becker et al. | |

FOREIGN PATENT DOCUMENTS

| | | |
|---|---|---|
| DE | 102005010479 A1 | 9/2006 |
| EP | 1901116 A2 | 3/2008 |
| JP | 01228692 A | 9/1989 |
| JP | 07051870 | 2/1995 |
| JP | 2000094173 A | 4/2000 |
| KR | 1020080066527 A | 7/2008 |
| WO | WO2006103104 A1 | 10/2006 |
| WO | WO2008006416 A1 | 1/2008 |

OTHER PUBLICATIONS

International Preliminary Report on Patentability and Written Opinion for corresponding PCT Application No. PCT/EP2012/061086, issued Jan. 7, 2014, 8 pages.

* cited by examiner

OPTICAL ELEMENT OF A LASER MATERIAL-PROCESSING MACHINE

CROSS REFERENCE TO RELATED APPLICATIONS

This application is a continuation of and claims priority under 35 U.S.C. §120 to PCT/EP2012/061086, filed on Jun. 12, 2012, which claims priority under 35 U.S.C. §119 to German Patent Application No. 10 2011 078 359.8, filed on Jun. 29, 2011. The contents of the prior applications are hereby incorporated by reference in their entirety.

TECHNICAL FIELD

The invention relates to an optical element for installation in a laser material-processing machine.

BACKGROUND

Laser material-processing machines have a laser processing head which may include as an optical element inter alia at least one lens or, in the case of YAG laser material-processing machines, may include a protective window as an optical element in addition to lenses. In the field of laser material-processing, optical elements do not have any identification beyond a laser-marked material number and a production date.

SUMMARY

In certain aspects, an optical element for a laser material-processing machine is associated with different items of information are associated which may be taken into consideration by the laser material-processing machine. In some aspects, an optical element intended for installation in a laser material-processing machine has a surface that during operation of the laser processing machine is optically unused, or not subject to the laser beam. Disposed in the region of the surface is a transponder containing readable information relating to the optical element.

With such an optical element it is possible to store not only data on the installation condition of the optical element but also properties that change during use of the optical element, and to take such data into consideration in the laser material-processing operation. That is particularly advantageous in the case of laser processing in the high-power range, that is to say, at powers of ≥1 kW. The optical element is therefore particularly advantageous for use at laser powers of ≥1 kW.

The optical element may be a transmissive or reflective optical element without mounting, holder, housing or the like. It may be an optical element in the sense of an optically active element, e.g., a lens, a protective window, a beam splitter, a reflector, a mirror, a filter or the like. An optical element may also be understood as being an optically active element having an attached part, such as a mounting, holder, housing or the like.

In the case of a transmissive optical element, it is possible, for example, for only a central region to be optically used or subject to the laser beam during operation, whereas an edge region is not subject to the laser beam or is not optically used. The transponder could then be disposed in the edge region without disturbing the optical properties of the optical element in operation.

In the case of a reflective optical element, it is possible, for example, for the opposite surface of the optical element from the reflecting side to be optically unused and not subject to the laser beam. The transponder could then be disposed on that surface, especially on the rear side of the optical element.

It is also conceivable for the transponder to be disposed on the optical element in such a way that it covers or shades a portion of the per se optically usable surface region. The covered or shaded portion of the surface becomes a surface that in operation of the laser processing machine is optically unused and/or not subject to the laser beam.

Particular advantages are obtained if the transponder is writable. Information regarding the history (especially the service life chronology of the optical element), and regarding the degree of soiling (especially information that changes during the period of use of the optical element), may thereby be stored in a memory of the transponder. A control system of the laser material-processing machine is thereby able to register, for example, the cutting hours of an optical element, since the installed lens can always be clearly recognized even when the laser processing head is changed. Equally, cleaning cycles and absorption history may be stored and displayed accordingly. A user thereby obtains information regarding an important wearing part of the laser material-processing machine. Processes that particularly promote wear (for example cutting with compressed air) may thus be discovered in the usage history by registration of the increase in absorption over the period of use. In that manner it is possible to identify, for example, wear-promoting processes that the optical element has undergone, to be able to make statements regarding the remaining lifetime of the optical element. It is possible to recognize whether a process has a wear-promoting effect on the optical element.

Arranging the transponder in the region of the peripheral surface of the optical element has the advantage that little of the optical element is obscured by the transponder, so that the optical properties of the optical element (e.g., the size of the optically usable surface area of the optical element), are only insignificantly impaired by the transponder. In addition, an appropriate reading/writing device may be disposed in a laser processing head in the region of the peripheral surface of the optical element in an especially simple manner. It is thereby possible to arrange the transponder and reading/writing device close to each other, so that only a low transmission power is necessary for wireless transmission of the information from the transponder to the reading/writing device or in the opposite direction.

It is especially advantageous if the transponder is disposed on the peripheral surface. It is thereby possible for information to be transferred from the transponder to the reading/writing device or in the opposite direction, in the radial direction of the optical element. As a result, the communication paths are especially short. In addition, no surface of the optical element is covered by the transponder in the direction of transmission of the optical element.

In some embodiments, the surface, especially the peripheral surface, may have a flat portion, especially a plane ground face or cut face, on which the transponder is disposed. The transponder may be fastened to a flat portion especially well and reliably. For example the transponder may be adhesively bonded better to a flat portion than to a curved portion. Furthermore, the flat portion of the peripheral surface makes it possible to compel the optical element to be installed in the correct position, for example by the fact that a mounting has a corresponding flat portion or is otherwise configured accordingly.

As already mentioned, in the field of laser material-processing in the high-power range it is especially advantageous if information regarding the history and/or condition of the optical element is stored in the transponder.

The transponder may be in the form of an RFID transponder. When an RFID transponder is used, the information may be wirelessly exchanged between transponder and reading/writing device. In addition, an RFID transponder does not require its own energy supply. A particularly small construction of the transponder is obtained if it is made of polymers. Coupling to a reading device may be effected by short-range alternating magnetic fields or by high-frequency radio waves. It is therefore possible not only to transfer data but also to supply the transponder with energy.

If the RFID transponder concerned is a writable RFID transponder, it may have an EEPROM memory or an FRAM memory. An SRAM memory is also conceivable in principle. The latter would, however, require its own power supply.

In some embodiments a laser processing head, especially a laser cutting head, has a mounting for the optical element. Furthermore, the laser processing head has a reading/writing device which is associated with the transponder of the optical element. When the optical element is installed, the transponder and the reading/writing device are preferably disposed in an opposed relationship and close to each other. It is therefore possible for the information to be read easily and without interference. Using the material number of the optical element, especially if it is a lens, it is possible to check for the correct focal length. The focal length may, however, also be stored as an independent value or, when linked to other characteristic data, may be derivable indirectly. It is therefore possible to prevent damage caused by installing an incorrect focal length. Using a unique serial number, which can be read out of the transponder, it is possible to ensure that the optical element concerned is an approved optical element. Here too, data regarding approval may be directly stored and directly retrievable.

For a laser sensor system to function, transmission at 500 nm may be important. If information relating to the source of raw material of the optical element is stored in the transponder, an improvement in accuracy is conceivable. That applies especially to a $CO_2$ sensor system. In the case of a YAG laser, the emissivity of the optical element could be stored in the transponder and be a parameter that is to be transferred.

On the mounting for the optical element, an orientation aid for installing the optical element in the correct position may be provided. The orientation aid may cooperate with a flat portion on the periphery of the optical element. It is thus possible to compel installation in the correct position by the shape given to the mounting and the optical element.

To prevent damage to the reading/writing device, provision may be made for the optical element to be disposed in a high-pressure chamber in which a gas under high pressure is disposed in operation of the laser processing head. The reading/writing device may be disposed in a low-pressure chamber in which a gas at a lower pressure than in the high-pressure chamber is disposed in operation of the laser processing head. The high-pressure chamber and the low-pressure chamber may be separated by a wall that has a non-metallic material at least in one region. By a non-metallic material, especially a dielectric material, being provided in one region it is possible to ensure that information may be exchanged between the transponder and the reading/writing device. As far as is generally known at present, that would not be possible if the wall were constructed entirely of metallic material.

For that purpose, the wall may have a passage opening which is closed by an element composed of non-metallic material. For example, the passage opening may be closed by a quartz window.

The optical element may be disposed in a lens cartridge the wall of which has a passage opening which is closed by an element composed of non-metallic material. The passage opening may, for example, be a drill-hole in the wall of the lens cartridge. Preferably, the diameter of the passage opening should approximately correspond to an antenna diameter of the transponder. A diameter for the passage opening of 6 mm has proved especially advantageous.

The passage opening may be closed by the element composed of non-metallic material in an especially simple manner if the element is adhesively affixed therein.

A method for operating a laser material-processing machine, comprises the method steps of:
  a. installation of an optical element that has a transponder in a laser processing head of the laser material-processing machine,
  b. reading out of at least some of the information regarding the optical element stored in the transponder, and
  c. analysis of the read-out information by a control system of the laser material-processing machine.

It is possible for the laser material-processing machine to determine whether the installed optical element is at all suitable for the forthcoming laser material-processing operation and whether the installed optical element is approved at all for the corresponding laser material-processing machine. In addition, it is possible for there to be stored in the transponder information that allows the laser material-processing machine to adjust the laser material-processing process in such a manner that optimized material processing may be carried out.

At least one of the following items of information regarding the optical element may be read out: material number, serial number, manufacturer, production date, batch number, raw material, emissivity, date put into service, transmission for test wavelength. By acquiring those parameters it is possible, for example, to recognize a batch of optical elements having a problem due to manufacturing defects. The laser material-processing machine is thereby able to recognize specifically the faulty optical elements and prevent a laser material-processing operation from being carried out with those faulty optical elements. The laser material-processing machine may, for example, be informed via web services which optical elements are faulty, the optical elements being identifiable, for example, by material number, manufacturer or production date.

It is especially advantageous if information regarding the use of the optical element is written to the transponder. As already mentioned, the period of use of the optical element may be stored. It is also possible for cleaning cycles, or the number of cleaning operations, the absorption history, the hours of operation, especially the laser "on" times, the laser power and laser power densities and/or the operating modes of the laser, that is to say, continuous wave or pulsed, to be stored and then read out again and, if required, displayed.

Corresponding data acquired in relation to the laser processing machine, for example directly via the cutting head electronics and/or indirectly via the laser control system, may be transferred to the transponder by linking to the reading/writing device. The link may be made both by lines and by other means for data transfer without physical connections.

In accordance with some method variants, installation of the optical element in the correct position can be verified with the aid of the transponder. If, for example, the optical element is installed upside down, the transponder may not be readable. It is thereby possible to recognize that the optical element has not been installed correctly.

In accordance with further method variants, it is possible to verify with the aid of the transponder whether the optical element concerned is an optical element that has been approved for the laser processing head or for the process that is to be carried out. That may be established by reading the corresponding information out of the transponder.

Further features and advantages of the invention will be apparent from the following description of an illustrative embodiment of the invention, by reference to the Figures and from the claims. The individual features may be implemented individually or a plurality thereof may be implemented in any desired combination in a variant of the invention.

BRIEF DESCRIPTION OF THE DRAWINGS

Like reference symbols in the various drawings indicate like elements.

DETAILED DESCRIPTION

Figure 1:
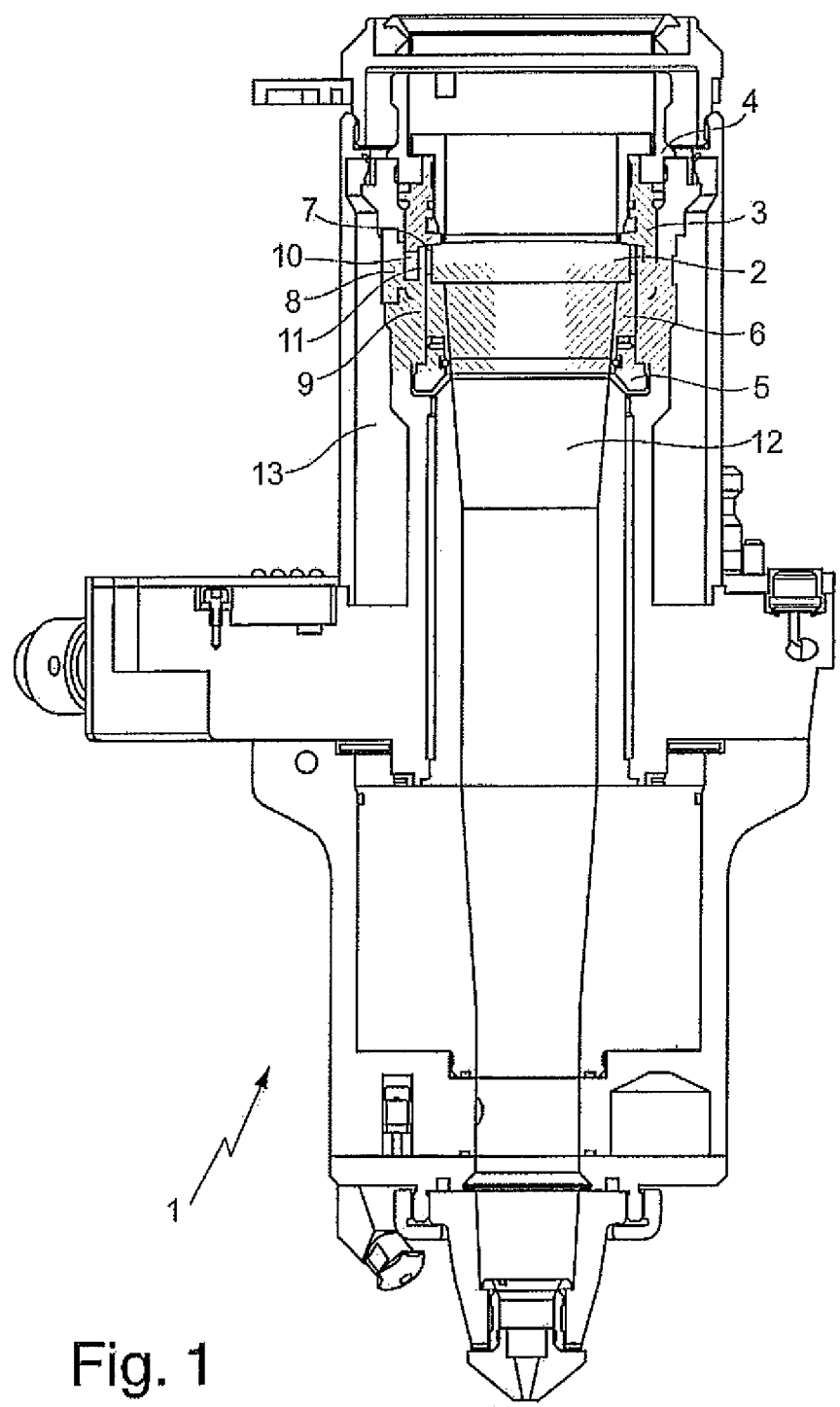
FIG. 1 is a longitudinal section of a laser processing head of a laser material-processing machine, in which an optical element is installed.

FIG. 1 shows a longitudinal section of a laser processing head 1 of a laser processing machine, in the form of a laser cutting head. The laser processing head 1 has an optical element 2 in the form of a lens. The optical element 2 is disposed in a lens cartridge 3, the lens cartridge 3 being replaceable, especially being capable of being taken out of the laser processing head 1. At the upper end of the lens cartridge 3, a threaded ring 4 is shown which holds the lens cartridge 3 in the laser processing head 1. The threaded ring 5 holds the optical element 2 in the lens cartridge 3, and hence in the laser processing head 1, by way of a spacer 6.

Disposed on the optical element 2 is a transponder 7 in the form of an RFID tag. The latter is situated opposite a reading/writing device 8. By the reading/writing device 8 information may be read out of the transponder 7 and, in some cases, information may also be written to the transponder 7. The reading/writing device 8 is in communication with a control system of the laser material-processing machine.

The wall 9 of the lens cartridge 3 has a passage opening 10 which is closed by an element 11 composed of non-metallic material. The element 11 composed of non-metallic material separates a high-pressure chamber 12, in which the optical element is disposed, from a low-pressure chamber 13 in which the reading/writing device 8 is disposed. Whereas the wall 9 is made of metallic material, the element 11 is made of non-metallic material, especially a dielectric material, e.g., quartz, plastics material or ceramics. That renders possible an exchange of information between transponder 7 and reading/writing device 8, which would not be possible if the wall 9 were constructed entirely of metallic material.

Figure 2:
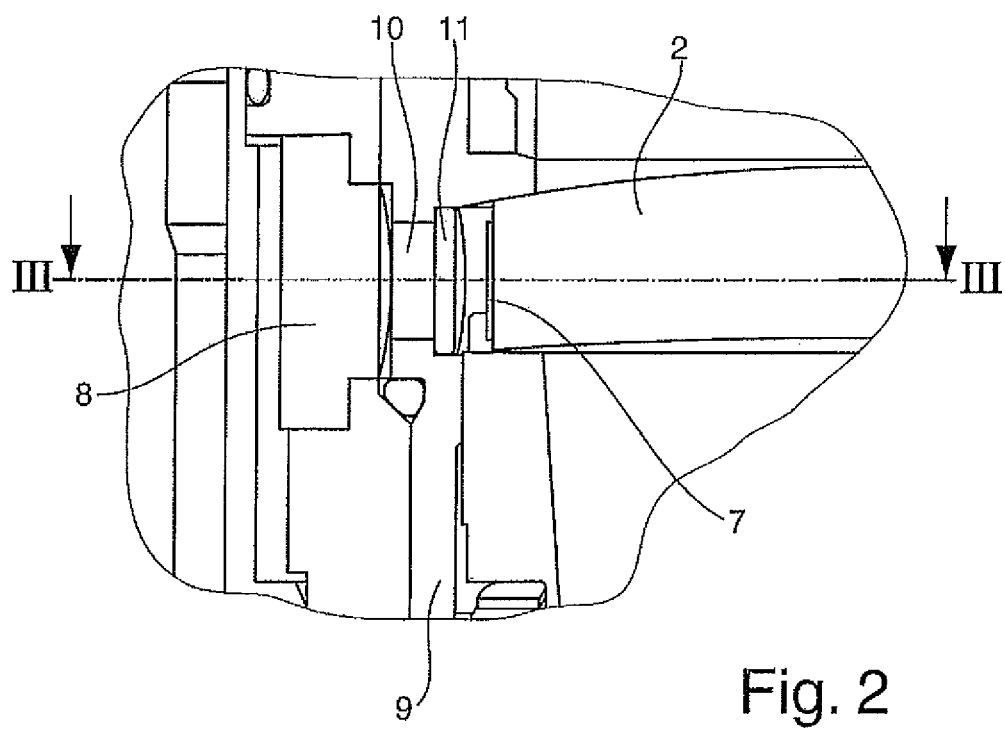
FIG. 2 is an enlarged detail of the laser processing head of FIG. 1.

It is apparent from the detail view of FIG. 2 that the diameter of the element 11 is greater than the diameter of the passage opening 10. In particular, the element 11 may have a diameter of approximately 8 mm, whereas the passage opening 10 preferably has a diameter of 6 mm. The size of the passage opening 10 is governed by the size of an antenna of the transponder 7.

Figure 3:
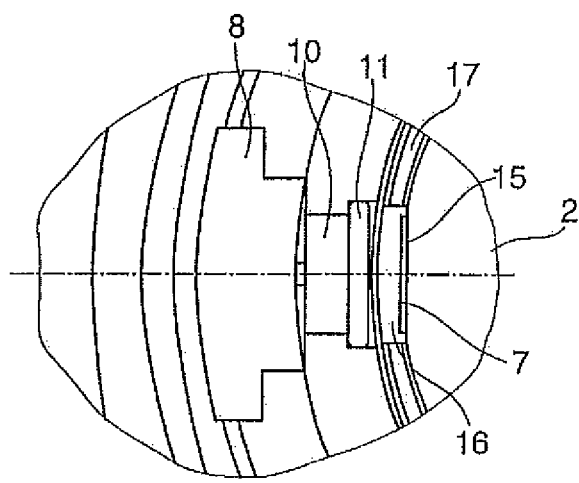
FIG. 3 is an enlarged cross-section of the laser processing head in the region of the optical element taken along line III-III in FIG. 2.

FIG. 3 shows a view in section along the line III-III of FIG. 2. It will be seen especially clearly here that the optical element 2 has a flat peripheral surface in a portion 15. The transponder 7 is disposed on that flat peripheral surface in the portion 15. In particular, the transponder 7 is provided in a recess 16 of the mounting 17 for the optical element 2. In that manner, the recess 16 constitutes an orientation aid for the installation of the optical element 2. In FIG. 3, it is also possible to see the passage opening 10, the element 11 and the reading/writing device 8.

A number of embodiments of the invention have been described. Nevertheless, it will be understood that various modifications may be made without departing from the spirit and scope of the invention. Accordingly, other embodiments are within the scope of the following claims.

The invention claimed is:

1. A laser processing head, comprising:
 an optical element attached to a mounting, the optical element comprising:
  a surface that is not subject to a laser beam during operation of the laser processing head when the optical element is installed in a laser processing machine, and
  a transponder disposed in a region on or near the surface and containing readable information relating to the optical element; and
 a reading/writing device configured to read or write, or both read and write information to the transponder, wherein the optical element is disposed in a high-pressure chamber in which a gas under high pressure is disposed during operation of the laser processing head, and the reading/writing device is disposed in a low-pressure chamber in which a gas at a lower pressure than in the high-pressure chamber is disposed during operation of the laser processing head, wherein the high-pressure chamber and the low-pressure chamber are separated by a wall that has a non-metallic material at least in one region.

2. The optical element according to claim 1, wherein the transponder is writable.

3. The optical element according to claim 1, wherein the surface is a peripheral surface of the optical element.

4. The optical element according to claim 3, wherein the peripheral surface has a flat portion in the form of a plane ground face or cut face.

5. The optical element according to claim 1, wherein information regarding the history or the condition of the optical element is stored in the transponder.

6. The optical element according to claim 1, wherein the transponder is in the form of an RFID transponder.

7. The laser processing head according to claim 1, comprising an orientation aid for installing the optical element in the correct position on the mounting.

8. The laser processing head according to claim 1, wherein the wall has a passage opening which is closed by an element composed of non-metallic material.

9. The laser processing head according to claim 1, wherein the optical element is disposed in a lens cartridge the wall of which has a passage opening which is closed by an element composed of non-metallic material.

10. The laser processing head according to claim 9, wherein the element composed of non-metallic material is adhesively affixed in the passage opening.

\* \* \* \* \*